United States Patent [19]

Hjortsberg et al.

[11] Patent Number: 4,806,806
[45] Date of Patent: Feb. 21, 1989

[54] COIL FOR ARRANGEMENT IN SLOTS IN A STATOR OR ROTOR OF AN ELECTRICAL MACHINE

[75] Inventors: Arne Hjortsberg; Göran Holmström, both of Västerås; Thommy Karlsson, Bälinge, all of Sweden

[73] Assignee: Asea Aktiebolag, Västerås, Sweden

[21] Appl. No.: 101,366

[22] Filed: Sep. 25, 1987

[51] Int. Cl.$^4$ ............................................. H02K 15/12
[52] U.S. Cl. ...................................... 310/45; 310/208; 310/215; 174/120 SR; 336/205; 428/324
[58] Field of Search ................... 310/43, 45, 208, 215, 310/213, 179, 180, 184, 198, 201, 254, 261; 174/120 SR; 336/205, 206; 428/324, 325

[56] References Cited

U.S. PATENT DOCUMENTS

| | | | |
|---|---|---|---|
| 2,656,290 | 10/1953 | Berberich | 310/208 |
| 3,254,150 | 5/1966 | Rogers, Jr. | 310/45 |
| 3,723,797 | 3/1973 | Andersson et al. | |
| 4,356,417 | 10/1982 | Smith | 174/120 SR |
| 4,399,190 | 8/1983 | Iwabuchi | 174/120 SR |

FOREIGN PATENT DOCUMENTS 55-53802  4/1980  Japan .
939747  10/1963  United Kingdom .

Primary Examiner—R. Skudy
Attorney, Agent, or Firm—Watson, Cole, Grindle & Watson

[57] ABSTRACT

A coil for arrangement in slots in a stator or rotor of an electrical machine, in particular a high voltage coil, comprising a bundle (17) of a plurality of conductors (18) located adjacent to each other and provided with a conductor insulation (19) for insulation of the conductors from each other as well as a main insulation (14) surrounding the bundle for insulation of the bundle against the machine slot. The main insulation consists of a wrapping of a tape- or sheet-formed insulating material wound in several layers around the bundle and comprising a layer with small mica flakes which, as well as the spaces between layers of mica flakes in the wrapping, contains a cured impregnating resin. At least that part of the impregnating resin located in the spaces between mica layers contains particles of a filler with an intrinsic thermal conductivity of at least 5 W/mK, such as aluminium oxide or boron nitride, and with a grain size of the particles of 0.1–15 μm in at least 90 percent of the filler.

5 Claims, 1 Drawing Sheet

COIL FOR ARRANGEMENT IN SLOTS IN A STATOR OR ROTOR OF AN ELECTRICAL MACHINE

BACKGROUND OF THE INVENTION

1. Field of the Invention

The present invention relates to a coil, in particular a high voltage coil, to be arranged in a slot in a stator or rotor of an electrical machine, and to a method for its manufacture.

2. The Prior Art

A coil which is arranged in slots in a stator or rotor in an electrical machine often comprises a bundle of a plurality of conductors located adjacent to each other, which are provided with a conductor insulation for insulation of the conductors from each other. The bundle may consist of several turns of one single insulated conductor. It may also consist of several separate insulated conductors, which are electrically connected to each other at their ends, usually parallel-connected.

The conductor bundle is surrounded by a main insulation for insulating the bundle against the machine slot. Because of the great demands which are placed on the main insulation as regards resistance to corona, the main insulation is to a considerable extent built up of mica. Normally, the main insulation consists of a wrapping of a sheet- or tape-formed insulating material consisting of a layer of small mica flakes overlapping each other and arranged on a carrier material, for example a woven glass fibre. An impregnating resin may be applied in and on the above-mentioned sheet- or tape-formed insulating material, for example by preimpregnating the insulating material with the resin which, when the insulating material is applied around the conductor bundle, binds the different layers in the main insulation to each other and to the conductor bundle. However, such a resin may instead be supplied after the insulating material has been applied around the conductor bundle and possibly also after several such insulated conductor bundles have been placed in the machine slots and been connected together to form a winding. The insulated conductor bundle as such, and when it is included in the winding, is then impregnated with an impregnating resin. Irrespective of in which way the impregnating resin is supplied, it is of the utmost importance that the impregnating resin to the greatest possible extent fills up voids in the wrapping of insulating material, so as to counteract the occurrence of corona discharges. The resin will then penetrate into the mica layers as well.

It is greatly desired that the main insulation has a good thermal conductivity because an increased thermal conductivity results in increased performance of the machine.

To improve the thermal conductivity of a mica insulation for electrical machines, Japanese patent application Laid-Open Print No. 53802/1980 proposes incorporating a powder of an inorganic material with a better thermal conductivity than the mica, such as boron nitride or aluminium oxide, into the mica layer together with synthetic fibres such as polyamide fibres, the task of the fibres being to serve as a reinforcing material for the mica insulation. The manufacture of the known mica insulation takes place by treating a suspension of small mica flakes, the powder of the inorganic material, and the synthetic fibres in accordance with a method similar to that used in paper manufacture while forming a sheetformed product. This causes the powder of the inorganic material, together with the synthetic fibres, to become embedded into the mica layer. When the mica insulation is later impregnated with an impregnating resin, the embedded powder particles facilitate the impregnation. In the known case, a size of the particles in the powder of the inorganic material of 30–100 $\mu$m is used.

According to the present invention, it has proved to be possible, by incorporating inorganic fillers in a main insulation for a coil for an electrical machine, to increase the electric strength considerably while at the same time it has been possible to retain the other properties of the insulation, such as mechanical properties, thermal properties, internal corona level and dissipation factor as a function of temperature and voltage. According to the invention, this is achieved by incorporation of a powder of inorganic material having good thermal conductivity and with a size of the powder particles of 0.1–15 $\mu$m.

More particularly, the present invention relates to a coil for arrangement in a slot in a stator or rotor of an electrical machine, comprising a bundle of a plurality of conductors arranged adjacent to each other and provided with a conductor insulation for insulation of the conductors from each other as well as a main insulation surrounding the bundle for insulating the bundle against the machine slot, the main insulation comprising a wrapping of a tape- or sheet-formed insulating material wrapped in several layers around the bundle and comprising a layer with small mica flakes which, as well as the spaces between layers of mica flakes in the wrapping, contains a cured impregnating resin, characterized in that at least that part of the impregnating resin which is located in the spaces between mica layers contains particles of a filler having an intrinsic thermal conductivity of at least 5 W/mK (Watts/meter.degree Kelvin) and with a size of the particles of 0.1–15 $\mu$m in at least 90 percent by weight of the filler. Preferably, the intrinsic thermal conductivity of the filler amounts to at least 10 W/mK and the size of the particles amounts to 0.7–5 $\mu$m in at least 90 percent by weight of the filler.

SUMMARY OF THE INVENTION

The invention is particularly adapted for use in electrical machines for operating voltages in excess of 3 kV.

The filler preferably consists of one or more of the substances boron nitride, aluminium nitride, silicon nitride, aluminium oxide, magnesium oxide, beryllium oxide and silicon carbide. It may be distributed both in that part of the resin which is arranged in spaces between mica layers and in that part of the resin which is arranged in mica layers. The filler may also —at least in all essentials—be distributed only in that part of the resin which is arranged in spaces between mica layers, whereby the mica layer, at least in all essentials, is free from filler.

The mica layer consists of a mat of small mica flakes, produced in a known manner by splitting of ordinary mica and treatment of a suspension in water of the small mica flakes, thus formed, in accordance with a method similar to that which is used in paper manufacture. The mat, which is self-carrying, consists of small mica flakes, overlapping each other, with a size of less than 5 mm$^2$, preferably less than 2 mm$^2$, which are held bound to each other by molecular forces acting between them. The splitting of the mica may, for example, take place by first heating the mica and then subjecting it to the effect of two consecutive solutions which react while developing gas.

The mica layer is normally attached to a carrier material, which preferably consists of a woven glass fibre but which may sometimes also consist of paper or of a fabric or mat of fibres of cotton or asbestos or a synthetic polymer, such as polyethyleneglycol terephtalate or polyamide.

As examples of suitable impregnating resins, which may be of conventional kind, may be mentioned solvent-free resins such as epoxy resins, unsaturated polyester resins, modified epoxy resins such as epoxynovolak resins and siloxane resins.

Of the total volume of impregnating resin and the filler, active for the thermal conduction, of the above stated kind in the main insulation, the volume of filler constitutes 5-50%, preferably 10-35%.

Of the total volume of mica, possible carrier material, impregnating resin and filler, active for the thermal conduction, in the main insulation, the volume of mica preferably constitutes 20-40%, the volume of carrier material preferably at most 15%, and preferably 5-15%, the volume of impregnating resin preferably 30-60%, and the volume of filler active for the thermal conduction preferably 10-30%. In addition to the filler mentioned, the insulation may to a limited extent contain other powdered additives such as finely-divided silicon dioxide.

A feasible explanation of the markedly improved electric strength obtainable according to the present invention is that the fine grain fractions of the filler active for the thermal conduction, which is used according to the invention, by efficient dispersion provides a very good homogeneity in the mixture of impregnating resin and filler. This means that the faults which may arise in the insulation and which may lead to breakdown become less pronounced than when using coarser grains. Another explanation may be that the propensity to damage the mica layers is smaller for small grains than for larger. This is probably of particular importance for that embodiment of the invention in which the mica layer is, in all essentials, free from filler.

According to one method of manufacturing a coil in accordance with the present invention, the insulating material in the main insulation may be impregnated with the impregnating resin either after the insulating material in the form of a wrapping has been applied around the conductor bundle, or before the insulating material is applied around the conductor bundle to form a wrapping. In the former case, the filler active for the thermal conduction is supplied to the impregnating resin prior to the impregnation. In the latter case, the filler may be supplied prior to or after the impregnation. When supplying it after the impregnation, the filler may, for example, be applied as a surface layer on the impregnated insulating material before it is shaped into a wrapping around the conductor bundle.

BRIEF DESCRIPTION OF THE DRAWINGS

The invention will be explained in greater detail by way of examples with reference to the accompanying drawing, wherein.

EXAMPLE 1

Figure 1:
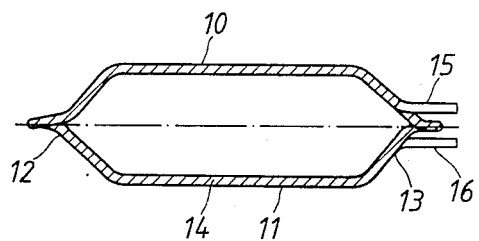
FIG. 1 shows a side view of a coil for an electrical machine.

The coil according to FIG. 1 has straight parts 10 and 11 intended to be placed in the stator slots of a high voltage machine and bent end parts 12 and 13 extending outside the slots 25 (see FIG. 2) of the machine. It is provided with a micaceous main insulation 14 according to the present invention. The coils has terminals designated 15 and 16.

Figure 2:
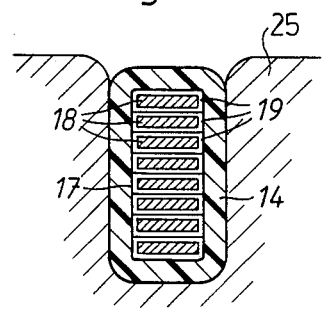
FIG. 2 shows the same coil in cross-section.
Figure 3:
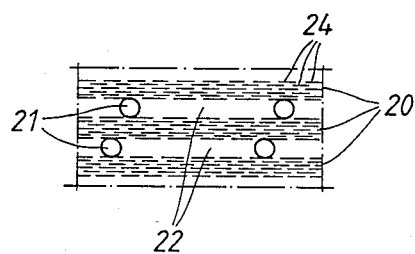
FIG. 3 shows a small part of the insulation of the same coil in cross-section.

As will be clear from FIG. 2, the coil according to Figure 1 has a bundle 17 of several conductors 18 arranged adjacent to each other, each conductor being provided with a conductor insulation 19. The conductor insulation 19 may, for example, consist of a wrapping of glass yarn impregnated with a binder, for example an epoxy resin or an alkyd resin, which has then been cured, or of a wrapping with a thin mica tape or of a varnish layer only of such type as is normally used when varnishing wire for electric machines and apparatus, such as terephthalic acid alkyds, polyester imides, polyimides, silicones, etc. Around the conductor bundle 17 the previously mentioned micacous main insulation 14 is arranged. The main insulation 14 is made by winding with, for example, half an overlap of an insulating tape, for example having a width of 25 mm and consisting of an 0.09 mm thick self-carrying layer of small mica flakes, overlapping each other, fixed to an 0.04 mm thick woven glass fibre tape with an 0.006 mm thick polyethyleneglycol terephtalate film. Upon fixation, the film melts partially and is accumulated at contact surfaces between mica tapes and glass fibre threads. Such an insulating tape is described in British Pat. No. 939,747. When the bundle has been provided with a wrapping of, for example, twenty layers of the mica tape placed one upon the other, the winding is first evacuated at a pressure of 0.1 mm Hg and at a temperature of 40° C., whereafter an impregnating resin containing boron nitride having a grain size of 0.5–1.5 μm is supplied at the mentioned pressure for impregnation of the wrapping. When all resin has been supplied, the pressure is raised to, for example, 10 kp/cm². The resin may consist of 100 parts by weight of an epoxy resin, which in a known manner has been manufactured of epichlorhydrin and 4.4'-dioxydiphenyl-dimethylmethane and which has an epoxy equivalence of 192, and 100 parts by weight of a curing agent consisting of a mixture of 75 parts by weight hexahydrophthalic acid anhydride and 25 parts by weight tetrahydrophthalic acid anhydride. The volume of boron nitride in the resin amounts to 30% of the total volume of boron nitride and resin. During the impregnation, resin with boron nitride penetrates into spaces between the mica layers and at least the resin into the mica layers themselves. In order for the resin not to penetrate out of the insulation during the subsequent curing, the impregnated conductor bundle with the mica tape wrapping may be surrounded by a sealing tape of polytetrafluoro ethylene or the like. The coil is then placed in a forming tool for curing of the resinous material. The curing takes place at a temperature of about 160° C. and for a period of about 10 hours. FIG. 3 shows a section through a few of the layers of the insulating tape of which the insulation 14 is composed. The layers 22 of mica flakes 24 are here designated 20, glass fibre threads in the glass fibre tape 21 and spaces between the mica layers 22. In the finished coil, 27% of the total volume of the main insulation consists of mica, 45% of resin, 20% of boron nitride, and 8% of glass fibre.

EXAMPLE 2

A coil is manufactured using an impregnating tape which is impregnated with impregnating resin prior to being wrapped around the bundle 17 (FIG. 2), which may be of the same kind as in Example 1. The resin contains an unsaturated polyester resin made of adipic acid (11 mole percent), phthalic acid anhydride (11 mole percent), maleic acid anhydride (23 mole per cent), and ethyleneglycol (55 mole per cent), to which have been added, on the one hand, diallyl phthalate in such an amount that the diallyl phthalate constitutes 40% of the total weight of polyester resin and diallyl phthalate and, on the other hand, benzoyl peroxide in an amount corresponding to 1% of the weight of the whole resin. In addition, aluminium oxide with a grain size of all the grains of 2-4 $\mu$m has been added to the resin in such an amount that the aluminium oxide constitutes 30% of the total volume of resin and aluminium oxide.

The polyester resin itself can be manufactured by reaction of a mixture of the mentioned acids and the alcohol in inert atmosphre by increasing the temperature to 220° C. and maintaining this temperature until the acid value of the reaction product is about 30. Prior to the impregnation of the insulating tape, the aluminium oxide is added to 100 parts by weight of the resin and these 100 parts by weight of the resin are diluted with 100 parts by weight acetone. The insulating tape, which may be of the same kind as that described under Example 1, can be impregnated with the resinous material at room temperature and atmospheric pressure. Thereafter, after driving off the solvent, the impregnated mica tape is wound around the conductor bundle 17 with half an overlap into thirty layers, placed one above the other, in order to form the main insulation 14. The coil is then placed in a forming tool for curing the resinous material at a temperature of 160° C. for a period of three hours.

In the finished coil, 27% of the total volume of the main insulation consists of mica, 45% of resin, 20% of aluminium oxide, and 8% of glass fibre.

EXAMPLE 3

A coil is manufactured using an insulating tape which is impregnated with impregnating resin without the addition of a filler prior to the winding of the insulating tape around the conductor bundle 17 (FIG. 2), which may be of the same kind as in Examples 1 and 2. The impregnating resin consists of 100 parts by weight of epoxynovolak "DEN 438" (Dow Chemical Co.) and 3 parts by weight of the boron trifluorideamine complex "HZ 935 J50" (Ciba Geigy AG). The surface of the impregnated insulating tape is coated with an even layer of aluminium oxide with a grain size of 2-4 $\mu$m in all the grains. The amount of aluminium oxide then constitutes 30% of the total volume of resin and aluminium oxide. The tape provided with the coating is wound around the conductor bundle 17 with half an overlap into thirty layers, placed one above the other, to form the main insulation 14. The coil is then placed in a forming tool for curing the resin at a temperature of 160° C. for a period of 8 hours. The filler will then not penetrate into, or will only to a minor extent penetrate into, the resin located in the mica layer 20, but remains completely or in all essentials in the spaces 22 between the mica layers. In the finished coil, 27% of the total volume of the main insulation consists of mica, 45% of resin, 20% of aluminium oxide, and 8% of glass fibre.

EXAMPLE 4

A coil is manufactured in the same way as under Example 3 but using the impregnating resin described in Example 1 and using a grain size of 10 $\mu$m of the aluminium oxide. The curing of the resin is performed at a temperature of 160° C. for a period of 10 hours.

EXAMPLE 5

A coil is manufactured in the manner described in Example 3 but with the difference that the aluminium oxide is not arranged as a coating on the surface of the insulating material but in the form of a coating on a thin tape in the form of a mat or fabric of a polymer fibre, for example fibre of polyethyleneglycol terephthalate or polyamide. The thin tape with the aluminium oxide coating is then wound together with the insulating tape around the conductor bundle to form the main insulation.

The boron nitride and the aluminium oxide in Examples 1-5 can be replaced by the same amount of aluminium nitride, silicon nitride, magnesium oxide, beryllium oxide, or silicon carbide or by the same amount of a mixture of two or more of these substances and boron nitride and aluminium oxide, the grains preferably having a grain size of 0.7-5 $\mu$m.

Although many unsaturated polyester resins and epoxy resins suited for impregnation of electrical insulations are known, some additional examples of such resins will be mentioned. Thus, for example, there may be used a polyester consisting of 60 parts by weight of a reaction product of 3 mole maleic acid anhydride, 1 mole adipic acid, and 4.4 mole ethyleneglycol with an acid value of 30, and of 40 parts by weight diallyl phthalate and containing 0.75% benzoyl peroxide, and a polyester resin consisting of 70 parts by weight of a reaction product of 1 mole fumaric acid, 1 mole phthalic acid, and 2.2 mole propylene glycol with an acid value of 25, and of 30 parts by weight monostyrene and containing 0.5% benzoyl peroxide, as well as an epoxy resin consisting of 100 parts by weight "Epon 828" (Shell Chemical Co.) and 65 parts hexahydrophthalic acid anhydride, an epoxy resin consisting of 85 parts by weight "Araldit F", 100 parts by weight "Hardener 905" (both from Ciba AG, Switzerland) and 15 parts by weight phenylglycidyl ether, or an epoxy resin consisting of 100 parts by weight "Dow 331" (Dow Chemical Co.) and 65 parts by weight tetrahydrophthalic acid anhydride.

We claim:

1. A coil for arrangement in a slot for a coil in an electrical machine comprising a bundle of a plurality of conductors arranged adjacent to each other and provided with a conductor insulation for insulation of the conductors from each other as well as a main insulation surrounding the bundle for insulation of the bundle against said slot, said main insulation comprising a wrapping of a flat insulating material which is wound in several layers around the bundle and which comprises a layer with small mica flakes, said wrapping including spaces between said layers with small mica flakes, said layers with small mica flakes and said spaces containing a cured impregnating resin, and wherein at least the impregnating resin located in said spaces contains particles of a filler having an intrinsic thermal conductivity of at least 5 W/mK and a particulate grain size of 0.1–15 μm in at least 90 per cent by weight thereof.

2. Coil according to claim 1, wherein said filler consists of at least one of the compounds selected from the group consisting of boron nitride, aluminium nitride, silicon nitride, aluminium oxide, magnesium oxide, beryllium oxide, and silicon carbide.

3. Coil according to claim 1, wherein said cured impregnated resin which is arranged in said layers with small mica flakes is essentially free of said filler.

4. Coil according to claim 1, wherein said flat insulating material is in the form of a tape.

5. Coil according to claim 1, wherein said flat insulating material is in the form of a sheet.

* * * * *

UNITED STATES PATENT AND TRADEMARK OFFICE
CERTIFICATE OF CORRECTION

PATENT NO. : 4,806,806

DATED : February 21, 1989

INVENTOR(S) : Arne Hjortsberg et al.

It is certified that error appears in the above-identified patent and that said Letters Patent is hereby corrected as shown below:

ON THE TITLE PAGE INSERT:

-- [30] Foreign Application Priority Data

October 22, 1986    Sweden ........ 8604509-3 --.

Signed and Sealed this

Eighteenth Day of July, 1989

Attest:

DONALD J. QUIGG

Attesting Officer

Commissioner of Patents and Trademarks